Figure 1:
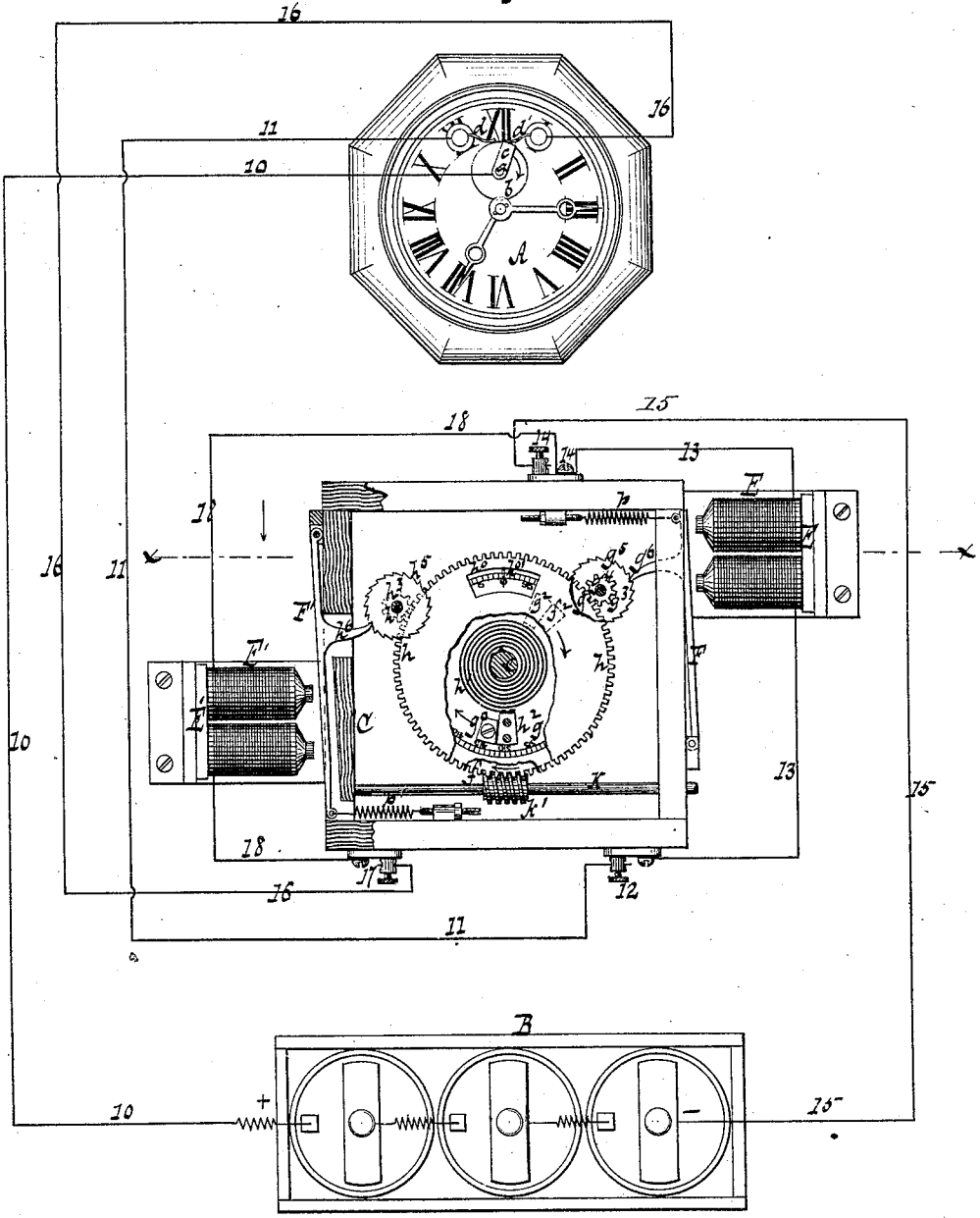

(Model.)

2 Sheets—Sheet 1.

A. MENSING.
REVOLUTION INDICATOR FOR MARINE ENGINES.

No. 247,673.

Patented Sept. 27, 1881.

Witnesses
Otto Aufeland
William Miller

Inventor
Adolf Mensing
by Van Santvoord & Hauff
his att'ys.

(Model.)
2 Sheets—Sheet 2.
A. MENSING.
REVOLUTION INDICATOR FOR MARINE ENGINES.
No. 247,673.   Patented Sept. 27, 1881.
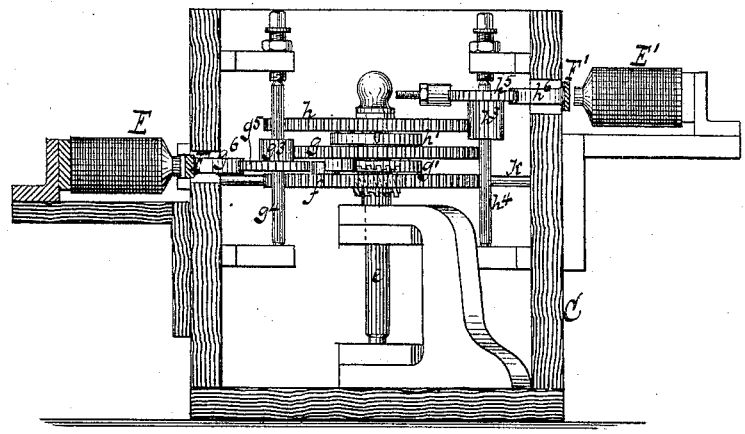
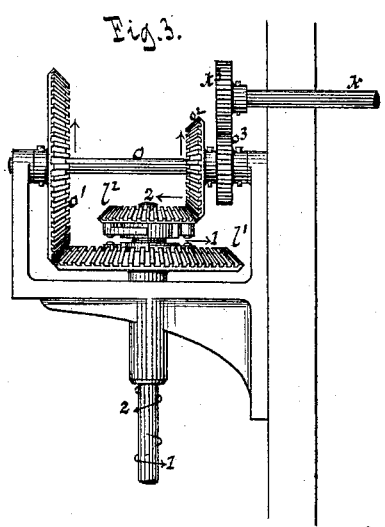
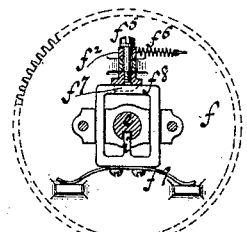
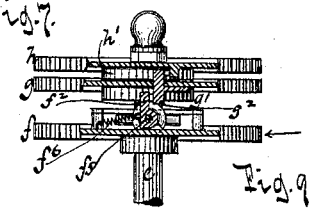
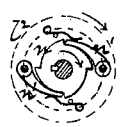
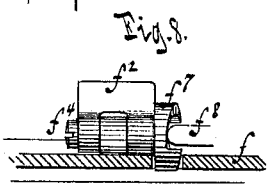
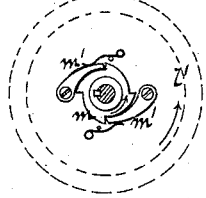
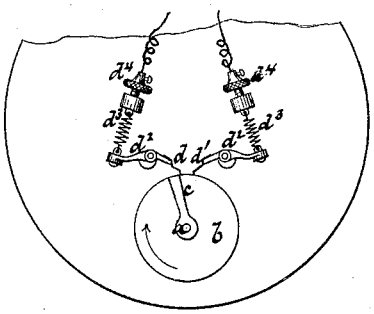
Witnesses
Otto Hufeland
William Miller
Inventor.
Adolf Mensing.
by Van Santvoord & Hauff
his attys.

UNITED STATES PATENT OFFICE.

ADOLF MENSING, OF NEW YORK, N. Y.

REVOLUTION-INDICATOR FOR MARINE ENGINES.

SPECIFICATION forming part of Letters Patent No. 247,673, dated September 27, 1881.

Application filed June 29, 1881. (Model.) Patented in England February 11, 1878.

*To all whom it may concern:*

Be it known that I, ADOLF MENSING, a subject of the King of Prussia, residing at New York, in the county and State of New York, have invented new and useful Improvements in Gyrometers for Marine Engines, of which the following is a specification.

This invention relates to an apparatus intended for counting the revolutions made by a shaft—such, for instance, as the propeller-shaft of a marine engine—during a given time, and at a distance from the engine, so that the officer on the bridge of a steamer is enabled to observe at any time how many revolutions per minute the engine makes, and that if the engineer has the order to make, say, forty revolutions per minute, the officer on the bridge can see if this order is complied with or not.

My apparatus consists, chiefly, of an index-wheel, a graduated wheel, and a wheel connected to the engine-shaft, which I term the "driven" wheel, all three mounted on one and the same shaft, the index-wheel and the graduated wheel being secured to the shaft by means of coiled springs, while the driven wheel is keyed to said shaft. With these wheels is combined a clock and an automatic releasing mechanism, so that at the end of every minute the graduated wheel is first released and caused to make a partial revolution, causing the index of the index-wheel to point to the figure on the graduation corresponding to the number of revolutions made during the preceding minute, and after a few seconds the index-wheel is released and both the graduated wheel and the index-wheel are restored to their normal position, ready to indicate the number of revolutions made during the next minute.

The various details of my invention will be pointed out in the following specification.

This invention is illustrated in the accompanying drawings, in which Figure 1 represents a plan or top view of my apparatus. Fig. 2 is a transverse section in the plane $x\,x$, Fig. 1. Fig. 3 is an elevation of the mechanism for transmitting motion from the engine-shaft to the driven wheel. The remaining figures are details, which will be referred to as the description progresses.

Similar letters indicate corresponding parts.

In the drawings, the letter A designates a clock, on the second-hand arbor $a$ of which is mounted a disk, $b$, of hard rubber or other bad conductor of electricity, and a metallic arm, $c$, the outer end of which overlaps the edge of the rubber disk. On the clock-dial are secured two metallic springs, $d\,d'$, the free ends of which bear upon the edge of the rubber disk $b$ and are in close proximity to each other. The disk $b$, being mounted on the second-hand arbor, makes one complete revolution per minute, and as the same revolves in the direction of the arrow marked on it in Fig. 1, the metallic arm $c$ is first brought in contact with the spring $d$, and two or three seconds afterward with the spring $d'$. The arbor $a$ connects by a wire, 10, with one—say the positive—pole of a galvanic battery, B, and the spring $d$ connects by a wire, 11, with a binding-screw, 12, and through this binding-screw with wire 13, which embraces an electro-magnet, E, and connects through the binding-screw 14 and wire 15 with the other (negative) pole of the battery B. The spring $d'$ connects by a wire, 16, with a binding-screw, 17, and through this binding-screw with a wire, 18, which embraces an electro-magnet, E', and connects through the binding-screw 14 and wire 15 with the negative pole of the battery B.

The electro-magnets E and E' and the binding-screws 12, 14, and 17 are secured to a box, C, which contains the counting mechanism. This mechanism consists, essentially, of a vertical shaft, E, on which are mounted three cog-wheels, $f\,g\,h$. (See Figs. 1, 2, and 7.)

The cog-wheel $f$, which I term the "driven" wheel, is secured to the shaft E by means of key $i$, Fig. 6, so that it is compelled to revolve with this shaft, except under certain conditions, which will be hereinafter described.

The wheel $g$, which I term the "graduated" wheel, is provided with a circular scale divided into one hundred (more or less) equal parts, which are numbered, and said wheel is secured to the shaft $e$ by a coiled spring, $g'$, Figs. 2 and 7, the inner end of which is connected to the shaft, while its outer end is connected to a stud, $g^2$, secured to the under surface of the wheel G.

The wheel $h$, which I term the "index" wheel, is provided with a segmental opening, $h^0$, Fig. 1, in the outer edge of which is secured the index $h^{0\prime}$, which points to the graduated scale of the wheel $g$, and said index-wheel $h$ is connected to the shaft $e$ by a coiled spring, $h'$, the inner end of which is secured to said shaft, while its outer end is connected to a stud, $h^2$, secured to its under surface.

From the driven wheel $f$ projects a stud, $f^2$, Figs. 1, 7, and 8, which is in the path of the stud $g^2$ of the graduated wheel $g$, and from the upper surface of this graduated wheel projects a stud, $g^0$, which is in the path of the stud $h^2$ of the index-wheel $h$.

The stud $g^0$ may either be made separate from the stud $g^2$, as shown in Fig. 1, or both the studs $g^2$ and $g^0$ may be made of one and the same piece, as shown in Fig. 7.

The graduated wheel $g$ gears into a pinion, $g^3$, mounted on an arbor, $g^4$, Figs. 1 and 2, and on this arbor is also mounted a ratchet-wheel, $g^5$, with which engages a pawl, $g^6$, whereby the wheel $g$ is prevented from revolving in the direction of the arrow marked on it in Fig. 1. In the same manner the index-wheel gears into a pinion, $h^3$, mounted on an arbor, $h^4$, Figs. 1 and 2, and on this arbor is also mounted a ratchet-wheel, $h^5$, with which engages a pawl, $h^6$, whereby the wheel $h$ is prevented from revolving in the direction of the arrow marked on it in Fig. 1.

The driven wheel $f$ gears into an endless screw or worm, $k'$, which is mounted on a horizontal shaft, $k$, Figs. 1 and 3, to which motion is imparted from the engine-shaft; and in order to turn the shaft $k$ always in one and the same direction, whatever the direction in which the engine-shaft revolves, a reversing-gear is applied, which is represented in Figs. 3, 4, and 5.

The engine-shaft is geared together with a vertical shaft, $l$, Fig. 3, on which are mounted two bevel-wheels, $l'$ $l^2$, the bevel-wheel $l'$ being connected to said shaft by ratchet $m$ and pawls $m'$, (see Fig. 5,) so that when the shaft $l$ and the ratchet $m$ (which is firmly mounted thereon) revolve in the direction of the arrow marked thereon in Fig. 5, the bevel-wheel $l'$ revolves in the direction of the arrows marked on it in Figs. 3 and 5, while the bevel-wheel $l^2$ is connected to the shaft by ratchet $n$ and pawls $n'$, Fig. 4, which are placed in the opposite position to the ratchet $m$ and pawls $m'$, so that the bevel-wheel $l^2$ runs loosely when the bevel-wheel $l'$ is moved by the shaft, and vice versa. The bevel-wheel $l'$ gears into a bevel-wheel, $o'$, mounted on a horizontal shaft, $o$, and the bevel-wheel $l^2$ gears into a bevel-wheel, $o^2$, mounted on the same shaft $o$, and this shaft is geared together with the worm-shaft $k$ by cog-wheels $o^3$ $k^3$. If the shaft $l$ turns in the direction of arrow 1, Fig. 3, its motion is transmitted to the worm-shaft $k$ by the bevel-wheels $l'$ $o'$ and cog-wheels $o^3$ $k^3$, and if the shaft $l$ turns in the direction of arrow 2, Fig. 3, its motion is transmitted to the worm-shaft $k$ by bevel-wheels $l^2$ $o^2$ and cog-wheels $o^3$ $k^3$; but the worm-shaft always revolves in one and the same direction.

By the action of the worm $k'$ the driven wheel $f$ on the shaft $e$ is caused to revolve in the direction of the arrow marked on it in Fig. 1, and thereby the stud $f^2$ is drawn away from the stud $g^2$ of the graduated wheel $g$, and at the same time the springs $g'$ $h'$ of the wheels $g$ $h$ are wound up, these wheels being prevented from turning with the wheel $f$ by the pawls $g^6$ $h^6$ and ratchet-wheels $g^5$ $h^5$. When the motion of the driven wheel $f$ has continued for one minute the pawl $g^6$ is released and the wheel $g$ follows the wheel $f$ by the action of its spring $g'$ until the stud $g^2$ strikes the stud $f^2$. By this motion a certain mark on the graduated scale of wheel $g$ is brought beneath the index $h^{0\prime}$ of the wheel $h$, whereby the number of revolutions made by the worm-shaft $k$, and consequently by the engine-shaft, can be observed. A few seconds afterward, giving just time enough to observe the number of revolutions, the pawl $h^6$ is released also, and the index-wheel $h$ follows the wheel $g$ until the stud $h^2$ strikes the stud $g^0$, thereby carrying the index $h^{0\prime}$ back to the zero-point of the graduated scale of wheel $g$. In the meantime the wheel $f$ continues to advance while the graduated wheel $g$, after having been permitted to overtake the wheel $f$, is immediately arrested again by the pawl $g^6$, so that its spring begins to wind up before the index-wheel $h$ is released, and the correct number of revolutions made by the engine-shaft during each succeeding minute can be observed by the number or mark on the graduated scale to which the index $h^{0\prime}$ points after the wheel $g$ has followed the wheel $f$ and before the wheel $h$ is released.

The pawls $g^6$ $h^6$ are secured to or formed on levers F F', which form the armatures of the electro-magnets E E', so that whenever the metallic arm $c$, mounted on the second-hand arbor $a$ of the clock A, passes beneath the spring $d$, whereby the circuit is closed through the electro-magnet E, the armature F is attracted, and the pawl $g^6$ releases the ratchet-wheel $g^5$, and consequently the graduated wheel $g$, and when the metallic arm $c$ has passed the spring $d$ the pawl $g^6$ drops back in gear with the ratchet-wheel $g^5$ by the action of the spring $p$, which acts on the armature-lever F. A few seconds afterward the metallic arm $c$ passes beneath the spring $d'$, the circuit through the electro-magnet E' is closed, the pawl $h^6$ releases the ratchet $h^5$ and the index-wheel $h$, and when the arm $c$ has passed the spring $d'$ the pawl $h^6$ drops back, and by the spring $p'$ and the index-wheel $h$ is again arrested.

The springs $d$ $d'$ bear on the circumference of the rubber disk $b$; and in order to be able to adjust their pressure against said disk, I have connected them to levers $d^2$, (see Fig. 9,) which are subjected to the action of adjustable springs $d^3$. By turning the adjusting-screws $d^4$ the pressure exerted by the springs $d$ $d'$ upon the disk $b$ can be regulated so as not to interfere with the clock-movement, and yet insure the closing of the electric circuit at the proper moment.

In case the pawls $g^6$ $h^6$ should fail to release the wheels $g$ $h$ from some cause while the motion of the driven wheel proceeds, the stud $f^2$ will strike the stud $g^2$ on its right-hand side in Fig. 7, when the wheel $f$ has made a complete revolution; and in order to avoid breakage, said stud $f^2$ is connected to the wheel $f$ by a pivot, $f^5$, (best seen in Figs. 7 and 8, and also in Fig. 6,) so that it can turn down toward the right, Fig. 7, but not toward the left. A spring, $f^6$, has a tendency to retain it in its upright position and to return it to this position after it has passed the stud $g^2$, the wheel $f$ moving in the direction of the arrow marked on it in Fig. 7.

On the inside of the stud $f^2$ is formed a cam, $f^7$, Fig. 8, which acts against a frame, $f^8$, Figs. 6 and 8, that is fitted into suitable guide-grooves on the top of the wheel $f$, and carries the key $i$, which engages with a key seat or groove in the shaft $e$. A spring, $f^9$, forces this key into its seat and presses the frame $f^8$ up against the cam $f^7$. When the stud $f^2$ strikes the right-hand side of the stud $g^2$, Fig. 7, and is turned down, the frame $f^8$ is forced back by the cam $f^7$, the key $i$ is thrown out of its seat in the shaft $e$, and the wheel $f$ revolves freely on said shaft until the stud $f^2$ has passed beneath the stud $g^2$, when the spring $f^9$ carries the same back to its upright position, and the motion of the wheel $f$ can proceed without producing any damage, while the defect in the releasing mechanism of the wheels $g$ and $h$ must be noticed, and time is obtained to remedy the same.

My gyrometer is intended particularly for steam-vessels which are to sail in company, in which case it is essential that the number of revolutions made by each engine shall be determined according to the speed of each vessel. The engineer of each vessel, therefore, must be instructed to run his engine at a certain speed, and by my apparatus the officer on the bridge of each vessel is enabled to see if the instructions are complied with.

In the example shown in the drawings the counting-wheels are placed in a horizontal plane; but in practice I prefer to place them in an inclined position, for the purpose of facilitating the observations.

What I claim as new, and desire to secure by Letters Patent, is—

1. The combination, substantially as hereinbefore described, of the wheel $f$, which receives motion from the engine-shaft, the graduated spring-supported wheel $g$, the spring-supported index-wheel $h$, the mechanism for arresting the wheels $g$ $h$, the studs $f^2$ $g^2$ $h^2$ on the several wheels, and the mechanism for releasing the wheels $g$ $h$.

2. The combination, substantially as hereinbefore described, of the wheel $f$, which receives motion from the engine-shaft, the graduated spring-supported wheel $g$, the spring-supported index-wheel $h$, the pinions $g^3$ $h^3$, and ratchets $g^5$ $h^5$, the pawls $g^6$ $h^6$, secured to the armatures of electro-magnets E E', the rubber disk $b$, mounted on an arbor which makes one revolution per minute, the metallic arm $c$ on said arbor, the springs $d$ $d'$, the galvanic battery B, and suitable connections between this battery, the arbor of the disk $b$, the springs $d$ $d'$, and the electro-magnets E E'.

3. The combination, substantially as hereinbefore described, of the wheel $f$, which receives motion from the engine-shaft, the graduated spring-supported wheel $g$, the spring-supported index-wheel $h$, the mechanism for arresting the wheels $g$ $h$, the studs $f^2$ $g^2$ $h^2$ on the several wheels, the mechanism for releasing the wheels $g$ $h$, the cam $f^7$, connected to the stud $f^2$, the spring-supported frame $f^8$, and the key $i$, connected to said frame.

4. The combination, substantially as hereinbefore described, of the wheel $f$, which receives motion from the engine-shaft, the graduated spring-supported wheel $g$, the spring-supported index-wheel $h$, the mechanism for arresting the wheels $g$ $h$, the studs $f^2$ $g^2$ $h^2$ on the several wheels, the mechanism for releasing the wheels $g$ $h$, and the reversing-gear.

In testimony whereof I have hereunto set my hand and seal in the presence of two subscribing witnesses.

ADOLF MENSING. [L. S.]

Witnesses:
  W. HAUFF,
  E. F. KASTENHUBER.